Patented Oct. 2, 1928.

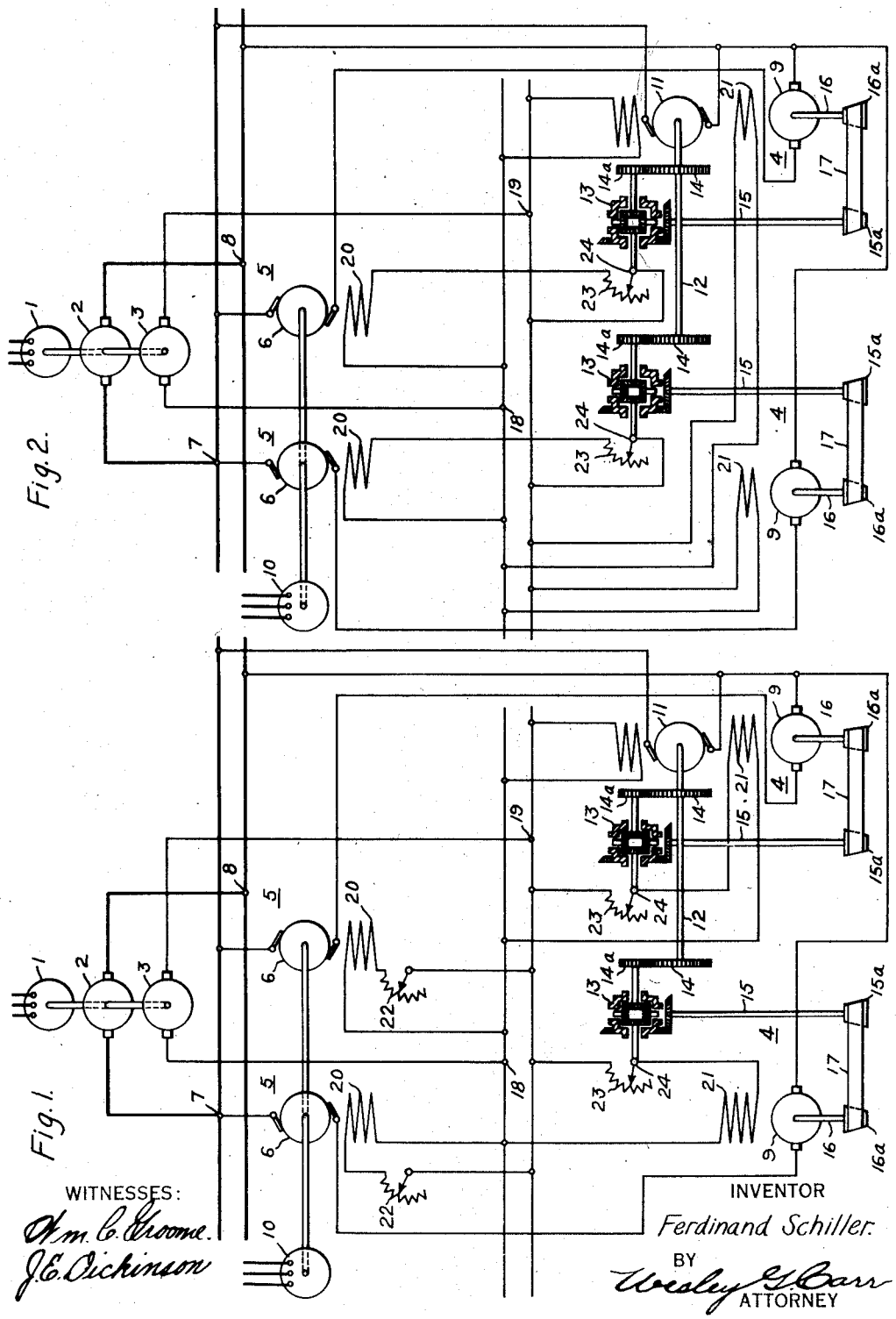

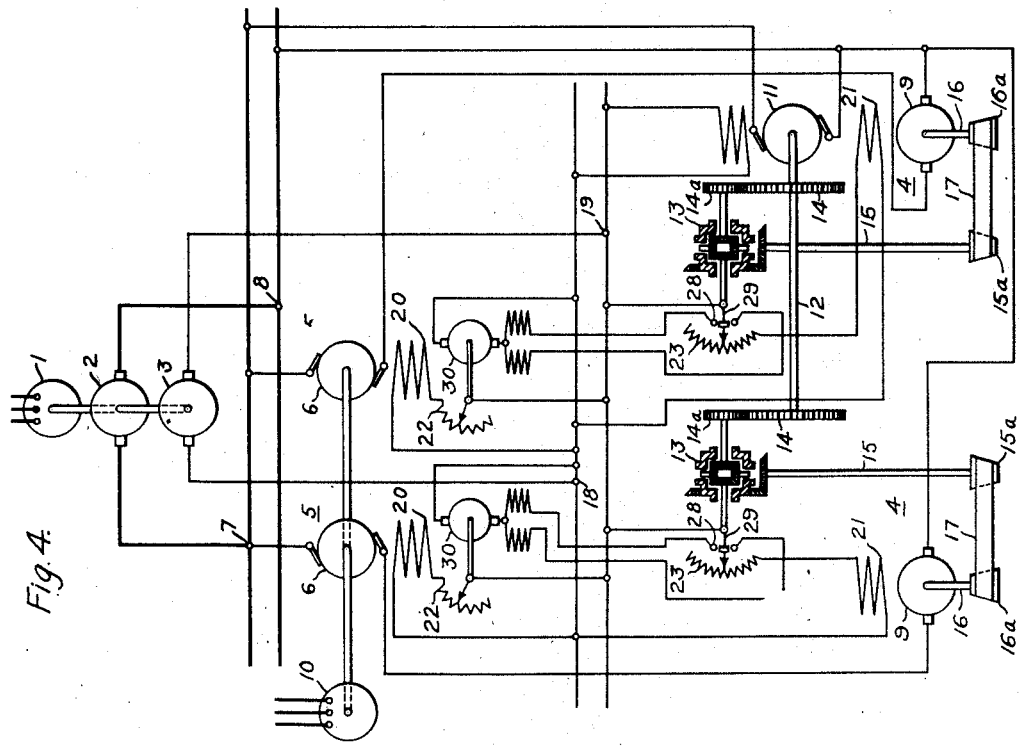
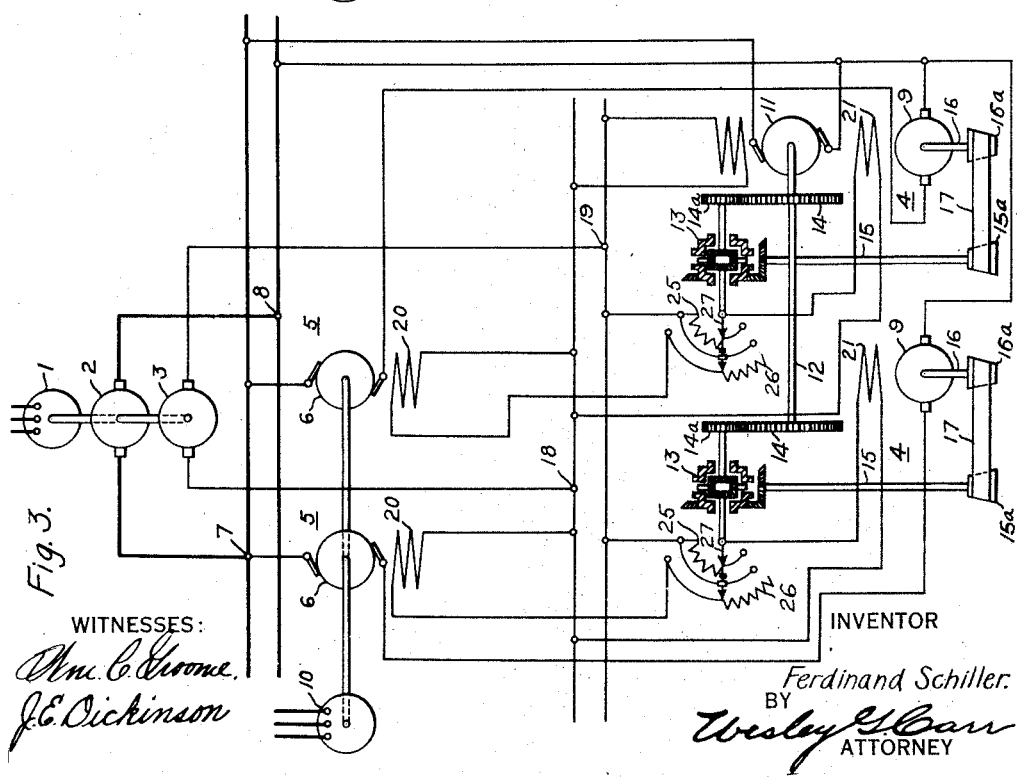

1,685,960

UNITED STATES PATENT OFFICE.

FERDINAND SCHILLER, OF BERLIN-CHARLOTTENBURG, GERMANY, ASSIGNOR TO WESTINGHOUSE ELECTRIC & MANUFACTURING COMPANY, A CORPORATION OF PENNSYLVANIA.

REGULATOR SYSTEM.

Application filed December 8, 1926, Serial No. 153,361, and in Germany February 4, 1926.

My invention relates to regulating systems and more particularly to systems for regulating two or more motors employed for driving the rolls of steel mills, paper mills, etc., where the machinery acts successively upon a continuous piece of material.

One of the objects of my invention is to provide a system whereby the relation of speeds between two or more motors may be kept substantially constant, even though the load on any one of the motors may vary.

Another object of my invention is the maintenance of speed ratios between the motors by automatic regulation of the magnetic fields of the individual motors and the simultaneous variation of the voltage delivered to the motors.

Another object of my invention is to vary the voltage delivered to the individual motors by providing auxiliary machines connected in series relation with the armatures of the cooperating motors and the excitation of which may be regulated either manually or automatically.

Another object of my invention is to provide a system of the above-described character which will be relatively simple in construction and reliable in operation.

Further objects of my invention will become evident from this specification, taken in conjunction with the accompanying drawings, wherein Fig. 1 is a diagrammatic view of a system in which my invention is applied to regulate motors employed for driving rolls that act successively upon a continuous piece of material;

Fig. 2 is a similar view of a system in which a "booster" field winding alone is varied;

Fig. 3 is another similar view of a system in which both the driving-motor excitation and the booster excitation may be automatically varied, and Fig. 4 is another similar view of a system in which a motor-operated rheostat is used to vary the excitation in connection with a differentially-operated resistor in circuit with the driving motor to automatically vary its excitation.

Referring to the drawings, the system shown here comprises a motor-generator unit, including a motor 1, a generator 2, and an exciter 3; a plurality of driving motors 4; a plurality of auxiliary machines or boosters 5 the armatures 6 of which are connected to feeder lines 7 and 8 in series relation with the armatures 9 of the driving motors 4; a motor 10 for driving the boosters 5, and a control motor 11, which is also connected to the feeder lines 7 and 8.

A control shaft 12 is connected to the control motor 11 and to corresponding sun gear-wheels of a plurality of differential mechanisms 13 through gear-wheels 14 that are fastened to the control shaft and pinions 14a. The planet gear-wheels of the differential mechanisms are coupled to the corresponding motors by means of shafts 15 and 16, pulleys 15a and 16a and belts 17.

The exciter 3 is connected, through conductors 18 and 19, to the field windings 20 of the boosters 5 and field windings 21 of the driving motors 4. Manually operable variable resistors 22 are connected in the field circuits of the boosters 5; and variable resistors 23 are connected in the driving-motor field circuits, the latter resistors being automatically operable by means of arms or shafts 24 which are secured to sun gear-wheels of the corresponding differential mechanisms 13.

The operation of the system as shown in Fig. 1 is relatively simple, the control motor 11 being energized by the supply generator 2 to drive the control shaft 12. The speed of each of the individual driving motors 4 is compared or referred to the speed of the control shaft 12 by the respective differential mechanisms 13. Any variation of the speed of a driving motor from its standard speed is counteracted by means of the corresponding differential mechanism, which operates in a well-known manner to move the arm 24 of the corresponding resistor 23, to vary the current traversing the field circuit of the corresponding driving motor 4.

In order to maintain the range of regulation that is effected by the field-circuit variations of the motors as small as possible, the drop in speed of motors 4 occurring when changing from no load to full load is counteracted by increasing the voltage provided by the boosters 5 by a proper amount, which may be effected by varying the excitation of the field circuits of the boosters by the manually adjustable field resistors 22. This system insures that the motors 4 will operate at almost full field, even at full load, and that the automatically actuable field resistors 23 must take care of only the relatively small variations in load. Variations in the auxiliary voltage (across conductors 18 and 19) will also be able to compensate for inaccuracies in the transmission ratios between the motors and the machinery parts driven thereby.

The boosters 5, being driven at a constant speed by a single driving motor 10 and being connected in series relation with the armatures 9 of the driving motors 4, will operate both with and against the cooperating motors, depending upon the excitation of the boosters. In the first case, the boosters will operate as generators and, in the latter case, as motors. The machine 10, driving the boosters, is preferably so connected that it will return energy to the line when the boosters operate as motors.

In Fig. 2, the system shown is similar to that shown in Fig. 1, the only modification being that no resistors are connected in the field circuit of driving motors 4, and the automatically adjustable resistors 23 are connected in the corresponding booster field circuits, being responsive to the differential mechanism 13, as before.

In this modification of my invention, the resistors 23 in the field circuit of the boosters are adjustable by the differential mechanisms 13, so that the driving motors 4 will always operate at full field strength. Equalization of the speeds of the motors 4 is effected by variations of the armature voltages thereof that are caused by the regulation of the field circuits of the booster. The range of regulation of the automatic regulators may be reduced by varying the excitation of the field circuits of the driving motors 4 by manually adjustable field rheostats, adjusted within predetermined limits.

In Fig. 3, a system similar to that shown in Fig. 1 is illustrated, but, in this system, double rheostats, severally comprising two resistors 25 and 26, are employed for adjusting the excitation of the field circuits of both the boosters and the driving motors, responsive to the differential mechanisms 13.

In this modification, the resistors 25 and 26 of each rheostat are respectively connected in the field circuits of both a driving motor 4 and the corresponding booster 5, each pair of resistors being arranged as one device, both to be varied by the compound contact arm 27 attached to the corresponding differential mechanism 13. The adjustment first effected is the variation of the booster field resistors 26, and, after the highest value of the booster voltage has been reached, the driving-motor field resistors 25 are varied. The conditions may be such that the regulation of the boosters 5 is effected in order to counteract the voltage drop between no load and a predetermined load value on the driving motors 4, and that further equalization of the speeds to take care of the loads is effected by regulating the field circuits of the driving motors 4.

In Fig. 4 the system is the same as that illustrated in Fig. 1, except that small pilot motors 30 are utilized to adjust the booster field resistors 22, said motors being energized to operate in the one or the other direction upon corresponding movement of the arm 29 that is actuated by the differential mechanisms 13. Auxiliary contact members 28 are so arranged as to complete the proper pilot-motor circuit through the corresponding arm 29 when it departs by a predetermined amount from its normal position.

In this modification of my invention, the speed of the driving motors is initially equalized by variation of the driving-motor field resistors 23, after which the pilot motors 27 cause changes in the voltages delivered by the boosters 5 for the armatures 9 of the driving motors, which affects the speed of these motors in the same manner as did the initial changes in their field currents.

Each differential mechanism 13 continually adjusts the corresponding resistor 23 that is connected in the driving-motor field circuits, so that the speeds of the motors 4 will remain constant, even though the voltage at the armature terminals varies. This adjustment ceases only when the rheostat arm 29 of the corresponding resistor 23 has reached its normal position, where it will be disengaged from the one or the other of auxiliary contact members 28, so that the corresponding pilot motor 27 is deenergized. The driving motor 4 will thus operate at a constant field strength, except for the short time of actual regulation.

While I have shown my invention in a number of preferred forms, modifications in the system and arrangement of parts may be made within the spirit and scope of my invention and such modifications are intended to be covered by the appended claims.

I claim as my invention:

1. A motor-control system comprising a plurality of driving motors, a plurality of boosters connected in series relation with said driving motors, a motor for driving said boosters, a control motor, and means responsive to variations in speed between said control motor and the driving motors to vary the excitation to said driving motors and said boosters to maintain a substantially uniform speed of the driving motors.

2. A motor-control system comprising a plurality of driving motors, a source of energy, a plurality of boosters connected to said source in series relation with said driving motors, a motor for driving said boosters, a control motor, means responsive to variations in the speed relation between said control motor and the driving motors for varying the excitation of said driving motors and said boosters to maintain the driving motors at a substantially uniform speed.

3. A motor-control system comprising a plurality of driving motors, a source of energy, a plurality of boosters connected to said source in series relation with said driving motors, an exciter for supplying excitation to the driving motors and boosters, a motor for driving said boosters, a control motor, and means responsive to variations in the speed relation between said control motor and the driving motors, for varying the excitation to said driving motors and said boosters, to maintain the driving motors at a substantially uniform speed.

4. A motor-control system comprising a plurality of driving motors, a generator constituting a source of energy, a plurality of boosters connected to said source in series relation with said driving motors, an exciter for supplying excitation to the driving motors and boosters, a motor for driving said boosters, a control motor, and means responsive to variations in speed relation between said control motor and the driving motors, for varying the excitation of said driving motors and boosters to maintain the driving motors at a substantially uniform speed.

5. A motor-control system comprising a plurality of driving motors, a motor-generator unit, said generator constituting a source of energy, an exciter coupled to said motor-generator unit, a plurality of boosters connected to said source in series relation with said driving motors, said exciter supplying excitation to the driving motors and boosters, a motor for driving said boosters, a control motor, and means responsive to variations in speed relation between said control motor and said driving motor for varying the excitation of said driving motors and boosters to maintain the driving motors at a substantially uniform speed.

6. A motor-control system comprising a plurality of driving motors, a motor-generator unit, said generator constituting a source of direct current, an exciter coupled to said unit, a plurality of boosters connected to said source in series relation with the driving motors, said exciter supplying excitation to said driving motors and boosters, a motor for driving said boosters, a control motor, a separate control shaft actuated by said control motor, means responsive to variations in the speed relation between said shaft and the driving motors for varying the excitation of said driving motors and booster to maintain the driving motors at substantially uniform speed.

7. A motor-control system comprising a plurality of driving motors, a motor-generator unit, said generator constituting a source of direct current, an exciter coupled to said unit, a plurality of boosters, connected to said source in series relation with said driving motors, said exciter supplying excitation to said driving motors and boosters, a motor for driving said boosters, a control motor, a plurality of differential mechanisms for coupling said control shaft to said driving motors, and means responsive to said differential mechanisms for varying the excitation of said driving motors and boosters upon variations in speed relation between said control shaft and the driving motors.

8. A motor-control system comprising a plurality of driving motors a source of direct current, a plurality of boosters connected to said source in series relation with said driving motors, a motor for driving said boosters, a control motor, a separate control shaft actuated by said control motor, a plurality of differential mechanisms for coupling said control shaft to said driving motors, and means responsive to said differential mechanisms for varying the excitation of said driving motors and boosters upon variations in speed relation between said control shaft and the driving motors.

9. A motor-control system comprising a plurality of driving motors, a motor-generator unit, said generator being a source of direct current, a plurality of boosters, connected to said source in series relation with said driving motors, a motor for driving said boosters, a control motor, a control shaft actuated by said control motor, a plurality of differential mechanisms for coupling said control shaft to said driving motor, said boosters having field windings, a plurality of variable resistors connected in series relation with said booster field windings, means responsive to said differential mechanisms for varying said resistors upon variations in speed relation between said control shaft and the driving motors.

10. A motor-control system comprising a plurality of driving motors, a motor-generator unit, said generator being a source of direct current, a plurality of boosters connected to said source in series relation with said driving motors, a motor for driving said boosters, a control motor, a separate control shaft actuated by said control motor, a plurality of differential mechanisms for coupling said control shaft to said driving motors, said driving motor and booster having field windings, a plurality of variable resistors connected in series relation with said driving motor and booster field windings, means responsive to said differentials for varying said resistors upon the variations in speed relation between said control shaft and the driving motors.

11. A motor-control system, comprising a plurality of driving motors, a motor-generator unit, said generator being a source of direct current, a plurality of boosters connected to said source in series relation with said driving motors, a motor to drive said boosters, a control motor, a separate constant-speed shaft actuated by said control motor, a plurality of differential mechanisms for coupling said control shaft to said driving motors, said driving motors and boosters having field windings, a plurality of variable resistors connected in series relation with said driving motor and booster field windings, a plurality of pilot motors so arranged as to vary the resistors in the booster field circuits when energized, means responsive to said differential mechanisms for varying said resistors connected in series relation with said driving motor field winding and means responsive to said differential mechanisms for energizing said pilot motor upon variations in speed relation between said control shaft and said driving motors.

12. A motor-control system comprising a plurality of driving motors, a source of direct current, a plurality of voltage boosters connected to said source in series relation with said driving motors, means for driving said boosters, a control shaft, means for actuating said shaft, a plurality of variable resistors, an excitation circuit to said driving motors and said boosters including said variable resistors, and means rendered responsive to variations in the speed relations between said control shaft and said driving motors for varying said resistors to maintain the driving motors at substantially uniform speeds.

In testimony whereof, I have hereunto subscribed my name this 9th day of November, 1926.

FERDINAND SCHILLER.